UNITED STATES PATENT OFFICE.

THOMAS H. ROSSER, OF SELMA, ALABAMA.

IMPROVEMENT IN SELF-RAISING LARD.

Specification forming part of Letters Patent No. 192,716, dated July 3, 1877; Reissue No. 7,979, dated December 4, 1877; application filed November 8, 1877.

*To all whom it may concern:*

Be it known that I, THOMAS H. ROSSER, of lma, in the county of Dallas and State of Alabama, have invented a Self-Raising Lard, of which the following is a specification:

This invention relates to an improved compound to be used for culinary purposes; and it consists in a composition formed by mixing with lard tartaric acid, bicarbonate of soda, alum, and starch, or in mixing with the lard materials which will evolve carbonic-acid or other gas suitable for raising bread.

To prepare the compound, take of tartaric acid, three ounces; bicarbonate of soda, four ounces; alum, one and a half ounce. Subject each separately to a gentle heat sufficient to remove the water of crystallization. They are then reduced to fine powder, and thoroughly intermixed, after having added one pound of starch. This mixture is now added to six pounds of pure lard that is entirely free from water, and the whole is thoroughly mixed together.

Any combination of ingredients yielding, by decomposition, carbonic-acid or other gas suitable to raise bread may be used with the lard in place of the compound herein described.

The lard prepared in this way may be used for all the purposes for which yeast or baking-powder and lard are used.

The lard in this compound protects the chemicals against dampness, and preserves their qualities intact. The chemicals also act as a preservative for the lard, keeping it sweet and preventing it from becoming rancid.

When the compound is used in cooking, it answers the double purpose of lard and baking-powder, as the bicarbonate of soda is decomposed, and the carbonic-acid gas is liberated by the action of the tartaric acid when the compound becomes moistened and heated in the article in which it is incorporated.

Having thus described my invention, I claim as new and desire to secure by Letters Patent—

1. A self-raising lard composed of lard having incorporated therewith materials capable of yielding, by decomposition, carbonic-acid or other gas suitable for raising bread.

2. A self-raising lard composed of lard having incorporated therewith tartaric acid, bicarbonate of soda, alum, and starch, or their described equivalents, substantially as and for the purpose specified.

THOMAS H. ROSSER.

Witnesses:
JOHN J. HALSTED,
GEO. T. SMALLWOOD, Jr.